US011573995B2

(12) United States Patent
Vargas et al.

(10) Patent No.: US 11,573,995 B2
(45) Date of Patent: Feb. 7, 2023

(54) ANALYZING THE TONE OF TEXTUAL DATA

(71) Applicant: International Business Machines Corporation, Armonk, NY (US)

(72) Inventors: Jesus Gabriel Trillo Vargas, Guadalajara (MX); Adolfo Mendez Morales, Guadalajara (MX); Juan Manuel Avalos Vega, Zapopan (MX); Alejandro Moreno Lopez, Tlaquepaque (MX)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 16/566,305

(22) Filed: Sep. 10, 2019

(65) Prior Publication Data

US 2021/0073255 A1    Mar. 11, 2021

(51) Int. Cl.
*G06F 16/00*         (2019.01)
*G06F 16/35*         (2019.01)
(Continued)

(52) U.S. Cl.
CPC .......... *G06F 16/353* (2019.01); *G06F 16/383* (2019.01); *G06N 20/00* (2019.01)

(58) Field of Classification Search
CPC .............................. G06F 16/353; G06F 16/383
(Continued)

(56) References Cited

U.S. PATENT DOCUMENTS 9,268,747 B2     2/2016 Enoki
9,336,268 B1 *   5/2016 Moudy ................ G06N 3/0445
(Continued)

FOREIGN PATENT DOCUMENTS

EP        3151131 A1     4/2017

OTHER PUBLICATIONS

Vanian, "Instagram Turns to Artificial Intelligence to Fight Spam and Cruel Comments", Jun. 29, 2017, TechFortune 500, <https://fortune.com/2017/06/29/instagram-artificial-intelligence-offensive-comments/>.

*Primary Examiner* — Ashish Thomas
*Assistant Examiner* — Rezwanul Mahmood
(74) *Attorney, Agent, or Firm* — Marcus Walker; Gavin Giraud

(57) ABSTRACT

Aspects of the present invention disclose a method for detecting textual inputs of a user of a social media application and derives personality characteristic insights of a user. The method includes one or more processors identifying a textual data entry to an interactive internet-based application. The method further includes determining a tone of the textual data entry. The method further includes identifying a posting account corresponding to the textual data entry. The method further includes generating a personality profile corresponding to the posting account based on the textual data entry associated with the posting account. The method further includes determining a context of the textual data entry based on semantic features of the textual data entry. The method further includes classifying the personality profile corresponding to the posting account. The method further includes performing a defined action that prevents engagement between the posting account and the interactive internet-based application.

20 Claims, 5 Drawing Sheets

(51) Int. Cl.
*G06N 20/00* (2019.01)
*G06F 16/383* (2019.01)

(58) Field of Classification Search
USPC .......................................................... 707/690
See application file for complete search history.

(56) References Cited

U.S. PATENT DOCUMENTS

| | | | |
|---|---|---|---|
| 9,418,375 B1* | 8/2016 | Cunico | G06F 16/36 |
| 9,432,325 B2 | 8/2016 | Skiba | |
| 9,451,085 B2 | 9/2016 | Skiba | |
| 9,542,692 B2 | 1/2017 | Sherman | |
| 9,542,712 B2 | 1/2017 | Gupta | |
| 9,563,693 B2* | 2/2017 | Zhang | G06Q 10/10 |
| 9,641,680 B1* | 5/2017 | Wold | H04W 84/042 |
| 10,037,491 B1* | 7/2018 | Fang | G06F 21/6218 |
| 10,123,165 B1* | 11/2018 | Graham | H04W 4/021 |
| 10,158,645 B1* | 12/2018 | Kenthapadi | G06N 20/00 |
| 10,162,900 B1* | 12/2018 | Chatterjee | G06F 16/334 |
| 10,210,147 B2* | 2/2019 | DeLuca | G06F 16/345 |
| 10,275,535 B1* | 4/2019 | Trauth | G06F 16/24556 |
| 10,325,288 B2 | 6/2019 | French | G06Q 30/0269 |
| 10,388,274 B1* | 8/2019 | Hoffmeister | G06N 3/0445 |
| 10,546,586 B2* | 1/2020 | O'Connor | G10L 15/22 |
| 10,629,086 B2* | 4/2020 | Chetlur | G06F 9/451 |
| 10,691,895 B2* | 6/2020 | Hewitt | G06F 16/955 |
| 10,831,990 B1* | 11/2020 | Tater | G06F 40/226 |
| 10,896,295 B1* | 1/2021 | Shenoy | G10L 15/187 |
| 11,068,758 B1* | 7/2021 | Liachenko | G06K 9/6263 |
| 11,165,725 B1* | 11/2021 | Silverstein | H04L 51/04 |
| 11,227,606 B1* | 1/2022 | Ramprashad | G10L 25/63 |
| 11,294,967 B2* | 4/2022 | Fox | G06F 16/958 |
| 11,354,507 B2* | 6/2022 | Fox | G06V 40/10 |
| 11,369,297 B2* | 6/2022 | Wu | G06V 10/454 |
| 2005/0080691 A1* | 4/2005 | Holm-Blagg | G06Q 40/04 705/30 |
| 2006/0289622 A1* | 12/2006 | Khor | G10L 17/02 235/375 |
| 2008/0215607 A1* | 9/2008 | Kaushansky | G06Q 30/02 707/999.102 |
| 2008/0275957 A1* | 11/2008 | Pouzin | G06Q 10/10 711/216 |
| 2010/0119053 A1 | 5/2010 | Goeldi | |
| 2010/0262454 A1* | 10/2010 | Sommer | G06F 16/355 706/55 |
| 2011/0077988 A1* | 3/2011 | Cates | G06Q 30/0203 704/E15.001 |
| 2011/0078206 A1* | 3/2011 | Chen | G06F 16/00 707/E17.046 |
| 2012/0030682 A1* | 2/2012 | Shaffer | H04N 21/23418 718/103 |
| 2012/0102114 A1* | 4/2012 | Dunn | G06F 3/04842 709/204 |
| 2012/0246054 A1* | 9/2012 | Sastri | G06Q 50/01 705/37 |
| 2012/0303659 A1* | 11/2012 | Erhart | H04L 61/30 709/204 |
| 2012/0323928 A1* | 12/2012 | Bhatia | H04L 51/02 707/E17.058 |
| 2013/0073387 A1* | 3/2013 | Heath | G06Q 30/02 705/14.53 |
| 2013/0124644 A1* | 5/2013 | Hunt | G06Q 50/01 709/206 |
| 2013/0133048 A1* | 5/2013 | Wyn-Harris | H04L 63/12 726/5 |
| 2013/0138577 A1* | 5/2013 | Sisk | G06Q 40/04 705/36 R |
| 2013/0290234 A1* | 10/2013 | Harris | G06Q 30/00 901/50 |
| 2013/0297383 A1* | 11/2013 | Fink | G06Q 30/02 705/7.32 |
| 2013/0311485 A1* | 11/2013 | Khan | G06F 16/335 707/758 |
| 2013/0325992 A1* | 12/2013 | McGann | G06Q 30/00 709/206 |
| 2014/0089816 A1* | 3/2014 | DiPersia | G06Q 50/01 715/753 |
| 2014/0108006 A1* | 4/2014 | Vogel | G06F 40/40 704/9 |
| 2014/0115004 A1* | 4/2014 | Isaacs | G06Q 30/02 707/784 |
| 2014/0164502 A1* | 6/2014 | Khodorenko | H04M 3/5191 709/204 |
| 2014/0164530 A1* | 6/2014 | Stoertenbecker | H04L 51/52 709/206 |
| 2014/0237057 A1* | 8/2014 | Khodorenko | H04L 12/1831 709/206 |
| 2014/0337328 A1* | 11/2014 | Sarvabhotla | G06Q 10/10 707/723 |
| 2014/0379379 A1* | 12/2014 | Janevski | G16H 50/20 705/3 |
| 2015/0039462 A1* | 2/2015 | Shastry | G06Q 30/0631 705/26.81 |
| 2015/0101008 A1* | 4/2015 | Zent | G06F 16/9535 726/1 |
| 2015/0106360 A1* | 4/2015 | Cao | G06Q 10/00 707/706 |
| 2015/0231502 A1* | 8/2015 | Allen | A63F 13/47 463/42 |
| 2015/0310393 A1* | 10/2015 | Bhaskaran | G06Q 10/1053 705/321 |
| 2015/0378986 A1* | 12/2015 | Amin | G06F 40/30 704/9 |
| 2016/0005050 A1* | 1/2016 | Teman | G06F 16/583 705/317 |
| 2016/0142787 A1* | 5/2016 | Mohamed | G06F 16/438 725/53 |
| 2016/0162582 A1* | 6/2016 | Chatterjee | G06F 16/248 707/706 |
| 2016/0188571 A1* | 6/2016 | Daniel | G06Q 50/01 704/9 |
| 2016/0196561 A1 | 7/2016 | Iyer | |
| 2016/0203500 A1* | 7/2016 | Williams | G06F 16/33 705/7.32 |
| 2017/0061298 A1 | 3/2017 | Lynes | |
| 2017/0083817 A1* | 3/2017 | Di Sciullo | G06F 40/205 |
| 2017/0116557 A1* | 4/2017 | Apte | G06F 16/3344 |
| 2017/0134577 A1* | 5/2017 | Wold | H04M 3/5175 |
| 2017/0255689 A1* | 9/2017 | Khatravath | G06F 16/9035 |
| 2017/0262451 A1* | 9/2017 | Milner | G06F 16/285 |
| 2017/0286551 A1* | 10/2017 | Wu | G06F 16/2465 |
| 2017/0300472 A1* | 10/2017 | Parikh | G06F 40/205 |
| 2017/0351676 A1* | 12/2017 | Allen | G06F 16/35 |
| 2017/0371865 A1* | 12/2017 | Eck | G06F 40/58 |
| 2017/0371870 A1* | 12/2017 | Eck | G06F 40/47 |
| 2018/0060338 A1* | 3/2018 | DeLuca | G06F 16/9535 |
| 2018/0063262 A1* | 3/2018 | Balasubramanian | H04L 51/212 |
| 2018/0067912 A1* | 3/2018 | DeLuca | G06F 40/166 |
| 2018/0095616 A1* | 4/2018 | Valdivia | H04M 1/724 |
| 2018/0109482 A1* | 4/2018 | DeLuca | G06N 20/00 |
| 2018/0137432 A1* | 5/2018 | Chen | G10L 25/63 |
| 2018/0144256 A1* | 5/2018 | Saxena | G06N 20/00 |
| 2018/0189691 A1* | 7/2018 | Oehrle | G06N 7/005 |
| 2018/0218308 A1* | 8/2018 | Dey | H04L 67/306 |
| 2018/0225591 A1* | 8/2018 | Chandramouli | G06N 20/00 |
| 2018/0308128 A1* | 10/2018 | DeLuca | G06Q 30/0261 |
| 2018/0310123 A1* | 10/2018 | DeLuca | H04L 67/55 |
| 2018/0330303 A1* | 11/2018 | Mosley | G06Q 10/06398 |
| 2018/0351895 A1* | 12/2018 | Rathod | A63F 13/31 |
| 2018/0375807 A1* | 12/2018 | Krans | H04L 51/02 |
| 2019/0034823 A1* | 1/2019 | Thapliyal | G06F 16/35 |
| 2019/0087767 A1* | 3/2019 | Lu | G06F 21/6218 |
| 2019/0124109 A1* | 4/2019 | Foster | H04L 67/306 |
| 2019/0158366 A1* | 5/2019 | Higgins | G06Q 30/016 |
| 2019/0158448 A1* | 5/2019 | Anders | H04L 51/212 |
| 2019/0166458 A1* | 5/2019 | DeLuca | H04W 4/023 |
| 2019/0197119 A1* | 6/2019 | Zhang | G06F 40/58 |
| 2019/0228427 A1* | 7/2019 | DeLuca | G06Q 30/0214 |
| 2019/0230170 A1* | 7/2019 | Marlin | G06F 16/9535 |

(56) References Cited

U.S. PATENT DOCUMENTS

| | | | |
|---|---|---|---|
| 2019/0294638 A1* | 9/2019 | Sugiyama | G06F 16/90332 |
| 2019/0295098 A1* | 9/2019 | Banipal | G06Q 30/016 |
| 2019/0364009 A1* | 11/2019 | Joseph | G06F 16/29 |
| 2019/0379750 A1* | 12/2019 | Zamora Duran | G06N 5/02 |
| 2020/0020447 A1* | 1/2020 | Generoso | G16H 50/70 |
| 2020/0026755 A1* | 1/2020 | Hewitt | G06F 40/30 |
| 2020/0073478 A1* | 3/2020 | An | G06F 3/011 |
| 2020/0090210 A1* | 3/2020 | Weldemariam | G06N 3/08 |
| 2020/0126174 A1* | 4/2020 | Halse | G06Q 50/265 |
| 2020/0134058 A1* | 4/2020 | Liu | G06F 16/2379 |
| 2020/0134095 A1* | 4/2020 | Weldemariam | G06F 16/35 |
| 2020/0135039 A1* | 4/2020 | Karna | G06V 40/174 |
| 2020/0137110 A1* | 4/2020 | Tyler | H04L 63/1483 |
| 2020/0143000 A1* | 5/2020 | Childs | G06F 16/248 |
| 2020/0186539 A1* | 6/2020 | Chakra | G06F 21/552 |
| 2020/0210490 A1* | 7/2020 | Hutchins | G06F 40/20 |
| 2020/0210521 A1* | 7/2020 | Hutchins | G06F 16/986 |
| 2020/0264746 A1* | 8/2020 | Mokrzycki | G06F 40/253 |
| 2020/0285696 A1* | 9/2020 | Stewart | G06F 16/904 |
| 2020/0288016 A1* | 9/2020 | Butler | H04M 3/5141 |
| 2020/0374179 A1* | 11/2020 | Arrabolu | H04L 41/0631 |
| 2020/0380561 A1* | 12/2020 | Ramos | H04W 4/021 |
| 2020/0401639 A1* | 12/2020 | Kussmaul | G06F 16/3349 |
| 2021/0019475 A1* | 1/2021 | Avedissian | G06V 20/41 |
| 2021/0026829 A1* | 1/2021 | Goyal | G06F 16/23 |
| 2021/0049476 A1* | 2/2021 | Davis | G06F 40/40 |
| 2021/0065407 A1* | 3/2021 | Trim | G06F 40/279 |
| 2021/0073255 A1* | 3/2021 | Trillo Vargas | G06N 20/00 |
| 2021/0073420 A1* | 3/2021 | Ramadhane | G06N 5/04 |
| 2021/0097240 A1* | 4/2021 | Singh | G06F 40/35 |
| 2021/0119951 A1* | 4/2021 | Santos | G06F 40/284 |
| 2021/0256542 A1* | 8/2021 | McDaniel | G06V 40/174 |
| 2021/0256629 A1* | 8/2021 | Jolly | G06Q 30/0282 |
| 2022/0383093 A1* | 12/2022 | Adebayo | G06K 9/6256 |

\* cited by examiner

| trait_id | big_five | category | percentile | score |
|---|---|---|---|---|
| trait1 | Activity level | personality | value1 | 0.2 |
| trait1 | Emotional range | personality | value2 | 0.6 |
| trait1 | Openness | personality | value3 | 0.4 |
| trait1 | Conscientiousness | personality | value4 | 0.5 |
| trait1 | Extraversion | personality | value5 | 0.8 |

FIG. 3A

| tone_id | type | classification | comment | handle |
|---|---|---|---|---|
| tone1 | negative | agitator | off-topic comment | @user1 |
| tone2 | positive | valid complaint | feedback comment | @user2 |

FIG. 3B

| context_id | category | concept |
|---|---|---|
| A | Product | Laptop |
| B | Service | Laundry |

FIG. 3C

| tone_id | trait_id | context_id | date |
|---|---|---|---|
| tone2 | trait1 | Context_B | 11/11/2011 |

| tone_id | trait_id | context_id | date |
|---|---|---|---|
| tone1 | trait2 | Context_A | 11/12/2011 |

700

| comment | tone_id | type | concept | context | handle | agitator warning | topic warning | context warning |
|---|---|---|---|---|---|---|---|---|
| comment X | tone1 | Negative | Laptop | Product | user1 | Yes | NO | No |
| comment Y | tone2 | Positive | Laundry | Service | user2 | No | Yes | No |

ANALYZING THE TONE OF TEXTUAL DATA

BACKGROUND OF THE INVENTION

The present invention relates generally to the field of social networking systems, and more particularly to managing comment postings on social media.

In recent years, there has been an increase in demand to utilize the advanced techniques for analyzing large and/or complex data sets. In particular, natural language processing (NLP), which is a sub-field of computer science that enables a computer to process and analyze large amounts of natural language data. Sentiment analysis utilizes NLP, computational linguistics, and text analysis to extract and analyze subjective information. A basic task in sentiment analysis is classifying the polarity of a given text where an expressed opinion of the given text is positive, negative, or neutral. Advance sentiment classification techniques are able to determine an expressive tone of a given text as well.

A neural network is a computing system modeled on the human brain, which provides a framework for many different machine learning algorithms to work together and process complex data inputs. A neural network is initially trained, where training includes providing input data and telling the network what the output should be. Neural networks have been used on a variety of tasks (e.g., speech recognition, machine translation, etc.).

Social media is an interactive computer-mediated technology that facilitates the creation and sharing of information through virtual communities and networks. User-generated content, such as text posts or comments, photos, videos, and data generated through online interactions are the lifeblood of social media. Users usually access social media services via web-based technologies on desktops and laptops, or download services that offer social media functionality to their mobile devices (e.g., smartphones and tablets).

SUMMARY

Aspects of the present invention disclose a method, computer program product, and system for detecting negative textual inputs of a user in a social media application and delivering an API for deriving personality characteristics insights to a manager. The method includes identifying, by one or more processors, a textual data entry to an interactive internet-based application. The method further includes determining, by one or more processors, a tone of the textual data entry. The method further includes identifying, by one or more processors, a posting account corresponding to the textual data entry. The method further includes generating, by one or more processors, a personality profile corresponding to the identified posting account based on the textual data entry associated with the identified posting account. The method further includes determining, by one or more processors, a context of the textual data entry based on semantic features of the textual data entry. The method further includes classifying, by one or more processors, the personality profile corresponding to the identified posting account. The method further includes in response to classifying the personality profile corresponding to the identified posting account into a first classification, performing, by one or more processors, a defined action that prevents engagement between the identified posting account and the interactive internet-based application.

BRIEF DESCRIPTION OF THE DRAWINGS

FIG. 3A is an example depiction of a database object that includes data corresponding to characteristics of a user, in accordance with embodiments of the present invention.

FIG. 3B is an example depiction of a database object that includes data corresponding to a tone of textual data, in accordance with embodiments of the present invention.

FIG. 3C is an example depiction of a database object that includes data corresponding to semantic features of textual data, in accordance with embodiments of the present invention.

FIG. 3D is an example depiction of database objects that includes data corresponding to context of textual data, in accordance with embodiments of the present invention.

FIG. 3E is an example depiction of a database object that includes data corresponding to a profile derived from textual data, in accordance with embodiments of the present invention.

DETAILED DESCRIPTION

Embodiments of the present invention allow for delivery of an application programming interface (API) for deriving personality characteristics insights associated with a message to a user based on textual inputs of a posting account of a social media application. Embodiments of the present invention detect and determine a tone of textual inputs of a posting account of a social media application. Embodiments of the present invention determine a profile associated with a posting account based on textual inputs of the posting account. Additional embodiments of the present invention derive a topic and context of textual inputs of a posting account to identify issue trends in textual inputs corresponding to one or more posting accounts interacting with content of a domain of a user of a social media application.

Some embodiments of the present invention recognize that current methods of identifying adverse user engagement within a social media domain are mostly methods to classify and route adverse textual data for review to take some remedial action. However, with the growth in popularity of sowing discord by posting inflammatory and digressive, extraneous, or off-topic messages in an online community, current methods are inefficient in identifying valid adverse user engagement. Various embodiments of the present invention solve this problem by utilizing cognitive analysis, tone analysis, and natural language processing (NLP) to classify a posting account, validate comments corresponding to the user, and derive context and topics of the validated comments to determine a profile and trend in comments within a domain of an online community.

Embodiments of the present invention can operate to increase efficiency of a computer system by reducing the amount of memory resources utilized by discarding irrelevant information. Additionally, various embodiments of the present invention improve the efficiency of network resources by reducing the amount of data the network has to transmit by restricting access to posting accounts classified as agitators.

Implementation of embodiments of the invention may take a variety of forms, and exemplary implementation details are discussed subsequently with reference to the Figures.

Figure 1:
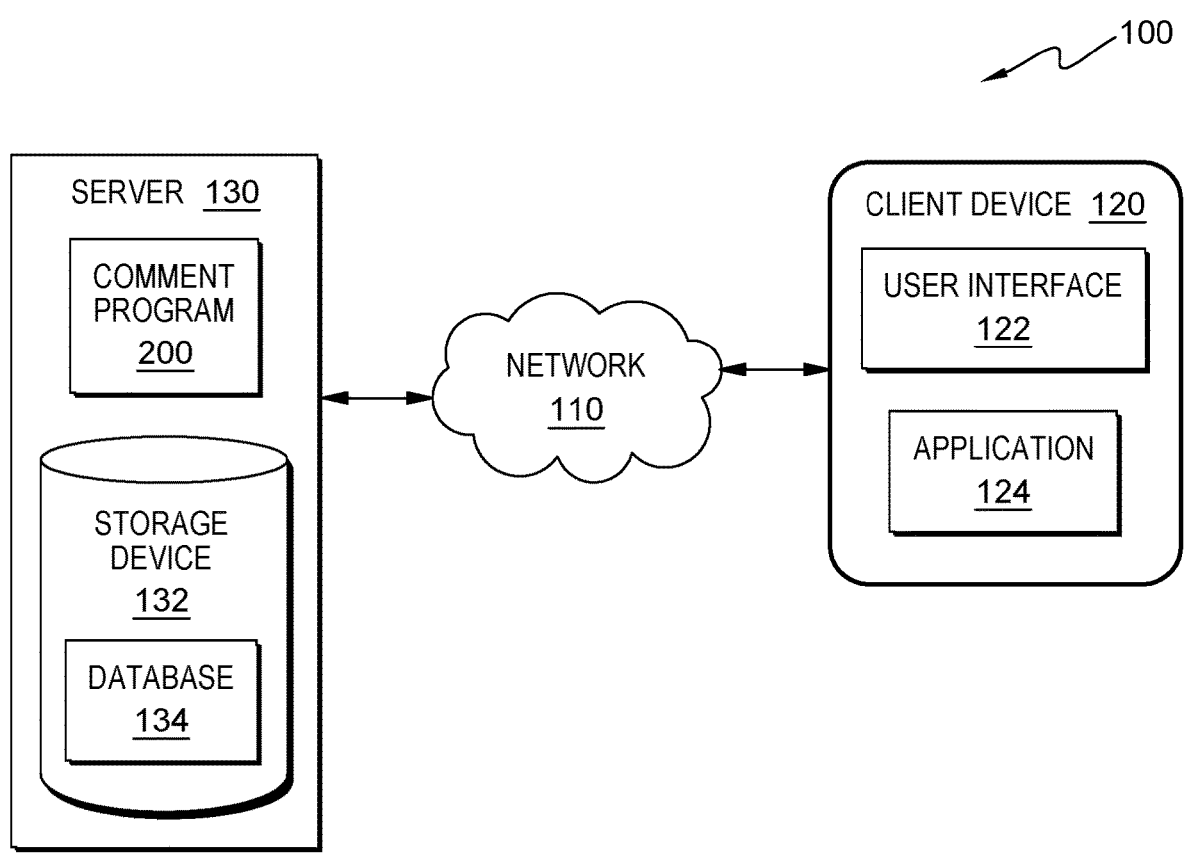
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Various embodiments of the present invention can utilize accessible sources of personal data, which may include personal devices (e.g., client device 120) social media content, and/or publicly available information. For example, embodiments of the present invention can optionally include a privacy component that enables the user to opt-in or opt-out of exposing personal information. The privacy component can enable the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An embodiment of data processing environment 100 includes client device 120 and server 130, all interconnected over network 110. In one embodiment, client device 120 and server 130 communicate through network 110. Network 110 can be, for example, a local area network (LAN), a telecommunications network, a wide area network (WAN), such as the Internet, or any combination thereof, and include wired, wireless, or fiber optic connections. In general, network 110 can be any combination of connections and protocols, which will support communications between client device 120 and server 130, in accordance with embodiments of the present invention. For example, a user of a mobile device (e.g., client device 120) uses the Internet (e.g., network 110) to post a comment on a social media page (e.g., web application) hosted on a server (e.g., server 130).

Client device 120 can be any device capable of executing computer readable program instructions. In various embodiments of the present invention, client device 120 may be a workstation, personal computer, digital video recorder, media player, personal digital assistant, mobile phone, or any other device capable of executing computer readable program instructions, in accordance with embodiments of the present invention. For example, client device 120 is a mobile device, which a user utilizes to respond to a customer review posted on a social media site. Client device 120 may include components as depicted and described in further detail with respect to FIG. 4, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web browser of a personal computer that a user can utilize to access a social media website. In another embodiment, a user utilizes application 124 of client device 120 to register with comment program 200 and define user preferences. For example, application 124 is a web browser of a mobile device that a user can utilize to set actions and notification settings for defined actions in response to comment program validating a comment.

In various embodiments of the present invention, server 130 may be a desktop computer, a computer server, or any other computer systems, known in the art. In certain embodiments, server 130 represents computer systems utilizing clustered computers and components (e.g., database server computers, application server computers, etc.), which act as a single pool of seamless resources when accessed by elements of data processing environment 100. In general, server 130 is representative of any electronic device or combination of electronic devices capable of executing computer readable program instructions. Server 130 may include components as depicted and described in further detail with respect to FIG. 4, in accordance with embodiments of the present invention.

In various embodiments, users authorize comment program 200 to collect and store information associated with devices and users, which have authorized the collection of information (i.e., users that have opted-in), in storage device 132. In one scenario, an owner of client device 120 authorizes comment program 200 to collect and store text data (e.g., comments, customer feedback, textual data, etc.) of application 124. In another scenario, an owner of client device 120 authorizes comment program 200 to perform a defined action on behalf of the owner using collected information of application 124. In an alternative embodiment, user's opt-in to utilize comment program 200. For example, a user visits a website associated with comment program 200 and the users accept the terms and conditions of comment program 200 as a part of the registration process.

Server 130 includes storage device 132, database 134, and comment program 200. Storage device 132 can be implemented with any type of storage device, for example, persistent storage 405, which is capable of storing data that may be accessed and utilized by server 130 and client device 120, such as a database server, a hard disk drive, or a flash memory. In one embodiment storage device 132 can represent multiple storage devices within server 130. In various embodiments of the present invention storage device 132 stores a plurality of information, such as one or more instances of database 134. In another embodiment, data processing environment 100 can include additional servers (not shown) that host additional information that accessible via network 110.

Comment program 200 may detect negative textual inputs of a posting account of a social media application and deliver an API for deriving personality characteristics insights of a posting account based on the textual inputs of the posting account. In one embodiment, comment program 200 utilizes application 124 to identify textual data of a web application. For example, comment program 200 parses a comment section of a user on a social media site to detect textual inputs of one or more posting accounts of the social media site. In another embodiment, comment program 200 determines a tone of a textual data of application 124. For example, comment program 200 utilizes a neural network to perform linguistic analysis to detect emotional and language tones in written text of a comment of a social media website. In various embodiments of the present invention, comment program 200 may execute locally on client device 120 or server 130.

In another embodiment, comment program 200 generates profile scores for a posting account based on textual data associated with the posting account and classifies the posting account based on the posting account profile scores. For example, comment program 200 collects publicly available written text associated with an identifier of a posting account and assigns a score to characteristics derived from the publicly available written text. In this example, comment program 200 classifies the posting account based on the assigned characteristic scores. Additionally, comment program 200 can classify a posting account as an agitator or moderate with respect to a profile score, tone, and/or characteristics. In another embodiment, comment program 200 determines relevant information from textual data of application 124, validates the relevant information, and generates an object based on the relevant information. For example, relevant information can include characteristics, scores, tones, etc., derived from a textual input of a posting account.

Figure 2:
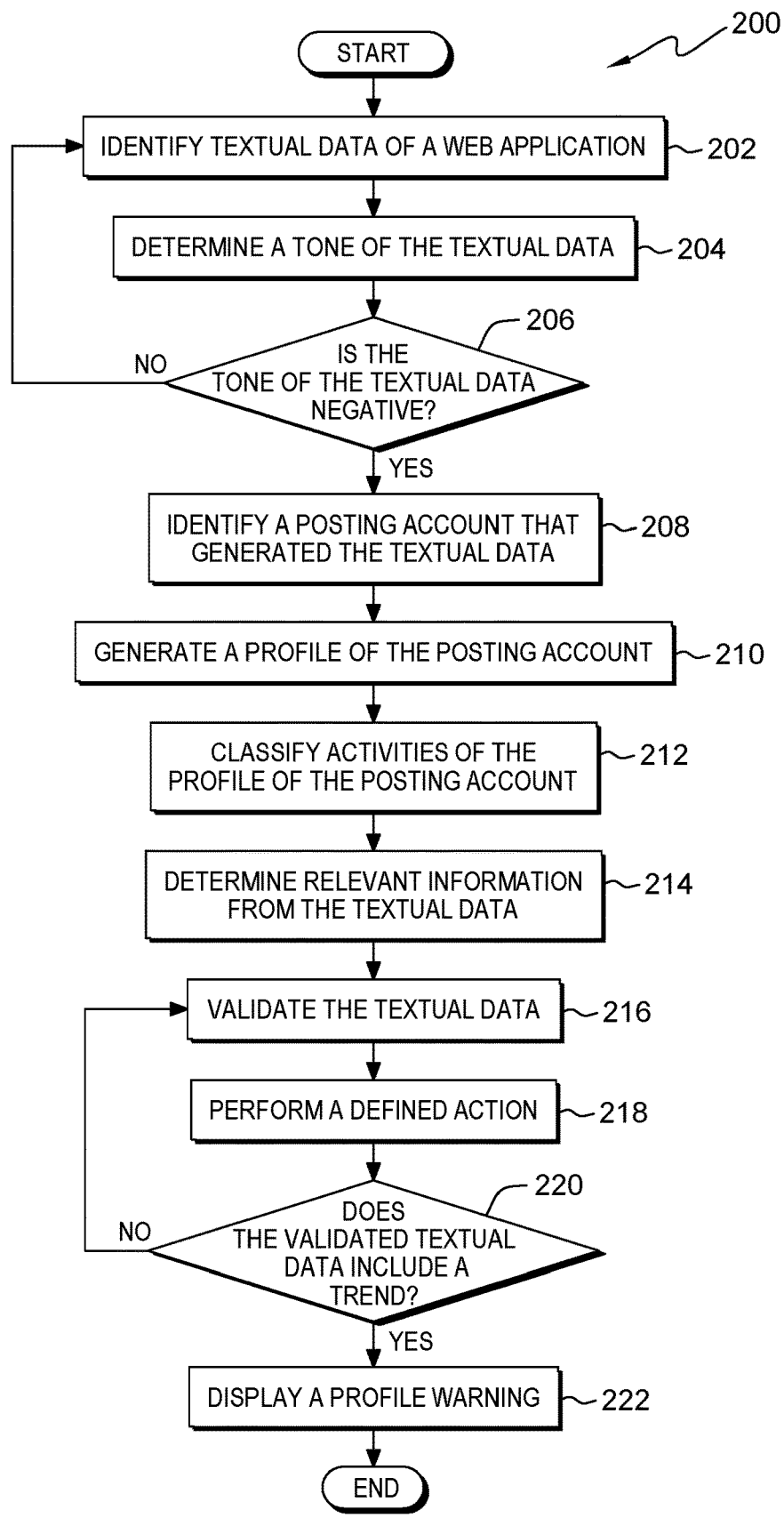
FIG. 2 is a flowchart depicting operational steps of a program, within the data processing environment of FIG. 1, for detecting negative textual inputs of a user in a social media application and delivering an API for deriving personality characteristics insights to a manager, in accordance with embodiments of the present invention.

FIG. 2 is a flowchart depicting operational steps of comment program 200, a program for detecting negative textual inputs of a posting account of a social media application and delivers an API for deriving personality characteristic insights to a user, in accordance with embodiments of the present invention. In one embodiment, comment program 200 initiates to analyze an existing set of textual data. For example, comment program 200 automatically initiates in response to a posting account leaving a comment under a social media post of a user. In another embodiment, comment program 200 continuously monitors application 124 for textual data. For example, comment program 200 monitors a notification of a social media application to detect comment notification, which comment program 200 initiates in response to detecting the comment notification.

In step 202, comment program 200 identifies textual data of a web application. In one embodiment, comment program 200 extracts data of application 124 to identify a textual data entry of application 124 (e.g., an interactive Internet-based application). For example, comment program 200 retrieves structured and unstructured textual data of a user-specific profile of a defined social media medium. In this example, comment program 200 uses text analytics (e.g., text data mining) to detect a comment in the user-specific profile of the defined social media medium. In another embodiment, comment program 200 monitors application 124 to detect a notification that indicates that a textual data entry has been made with an interactive internet-based application. For example, comment program 200 monitors a notification application (e.g., application 124) of a mobile device (e.g., client device 120) and detects notifications corresponding to a profile of a user associated with a social media application. In this example, comment program 200 uses natural language processing (NLP) to determine whether the notification corresponds to a comment (e.g., textual data entry).

In step 204, comment program 200 determines a tone of the textual data. In one embodiment, comment program 200 utilizes a cognitive model to determine a tone of a textual data entry of application 124. For example, comment program 200 can utilize supervised learning (e.g., support vector machines (SVMs)) to train a machine-learning model (e.g., neural network) to identify a tone of a comment. Additionally, comment program 200 generates a classifier for each class, where a training set consists of the set of test comments in the class (positive labels) and its complement (negative labels) and given a test comment maps each classifier separately. In this example, comment program 200 utilizes several categories of features (e.g., N-grams (unigrams, bigrams, and trigrams), punctuation, emoticons, curse words, greetings (such as "hello," "hi," and "thanks"), and sentiment polarity, etc.) to classify a tone of the comment of the user-specific profile of the defined social media medium. In another example, comment program 200 uses a using a One-vs-Rest (OVR) paradigm to train a model independently for one or more tones, where the paradigm used the comments for each class as positive samples and all other comments as negative samples, and identifies the tones that were predicted with at least 0.5 probability as the final tones.

In another example, comment program 200 inputs a string of characters correspond to a comment into a machine-learning model that provides a score (e.g., on a scale of 0.5 to 1, where 1 is a greater value) to one or more emotional and/or language tone classifications (e.g., anger, fear, joy, sadness, analytical, confident, tentative, etc.) of the comment and assigns the comment an identifier (ID). In this example, comment program 200 compares the score of the one or more emotional and/or language tone classifications to a defined threshold value (e.g., 0.75, which indicates a high likelihood that a tone is perceived) that correlates to a target F1-score of the machine learning model. Additionally, comment program 200 assigns an ID to a tone with a score that equals or exceeds the defined threshold and/or a tone with the highest score. Furthermore, comment program 200 stores the comment and data corresponding to the comment (e.g., IDs, scores, etc.) in a database of a server (e.g., server 130).

In decision step 206, comment program 200 determines whether the tone of the textual data is negative. In one embodiment, comment program 200 determines a tone based on a textual data entry of application 124. For example, comment program 200 utilizes NLP and cognitive linguistic techniques to classify a polarity and a tone of a comment of the user-specific profile of the defined social media medium based on textual data of the comment. In this example, comment program 200 parses the comment of the user-specific profile to detect words commonly associated with a polarity (e.g., negative, neutral, positive, etc.) and tone. Additionally, the detected words associated with the polarity are ranked and assigned an integer on a scale of −5 to +5 (i.e., most negative up to most positive) based on how the detected word relates to a concept in a specified domain (e.g., customer service, product support, issue reporting, etc.), which allow ratings of words to be adapted to the concepts in context with the specified environment. Furthermore, comment program 200 assigns a score to an identified polarity and/or expressive tone of the comment based on a rank of the detected words included in the comment.

If comment program 200 determines that a tone of a textual data entry is positive (decision step 206, "NO" branch), then comment program 200 continues to identify textual data entries of application 124 (in step 202). In one scenario, if comment program 200 parses a comment and detects words commonly associated with a positive polarity and tone (e.g., assigned an integer of 3), then comment program 200 continues to use text analytics (e.g., text data mining) to detect a comment in the user-specific profile of the defined social media medium.

In step 208, comment program 200 identifies a posting account that generates the textual data. More specifically, in response to comment program 200 determining that a tone of a textual data entry is negative (decision step 206, "YES" branch), comment program 200 identifies a posting account as a source of the comment. In one scenario, if comment program 200 parses a comment and detects words commonly associated with a negative polarity and tone (e.g., assigned an integer of −3), then comment program 200 extracts an identifier corresponding to a posting account that is the source of the comment.

In one embodiment, comment program 200 utilizes NLP to determine an identifier of a posting account corresponding to a textual data entry of a defined social media medium. For example, comment program 200 retrieves structured and unstructured textual data of a posting account from a publicly available social media medium (e.g., social media public profile). In this example, comment program 200 uses text analytics (e.g., text data mining) to identify a user ID (e.g., username, Uniform Resource Locator, etc.) of a posting account in textual data of the comment of a user-specific profile. Additionally, comment program 200 stores the user ID and the comment in a database of a server.

In step 210, comment program 200 generates a profile of the posting account. In one embodiment, comment program 200 utilizes textual data of application 124 to generate a set of data corresponding to an identifier of a posting account. For example, comment program 200 uses a machine learning algorithm to create a characteristic profile that corresponds to an extracted user ID of a posting account associated with textual data of a publicly available profile of the posting account. Generally, comment program 200 may utilize multiple textual data entries corresponding to the posting account to generate a profile. In this example, comment program 200 uses an open-vocabulary approach to train the machine learning algorithm using scores from surveys that are conducted among a plurality of posting accounts and derived profile data of one or more posting accounts of a defined social media medium.

Additionally, the machine learning model includes five (5) personality characteristics (e.g., agreeableness, conscientiousness, extraversion, emotional range, openness, etc.) that represent user engagement, twelve (12) needs (e.g., excitement, harmony, curiosity, ideal, closeness, self-expression, liberty, love, practicality, stability, challenge, structure, etc.) that represent aspects of a product that resonate with the author of a comment, and five (5) values (e.g., self-transcendence, tradition, hedonism, self-enhancement, excitement, etc.) that represent motivating factors that influence user decision making. Furthermore, comment program 200 uses the machine learning model to generate scores that correspond to identified personality characteristics and values, where a score above the mean of 0.5 on a scale of zero (0) to one (1) indicates a greater than average tendency for a characteristic and a score at or above 0.75 indicates readily discernible aspects of the characteristic.

In another example, comment program 200 retrieves structured and unstructured textual data that corresponds to the extracted user ID that is publicly available and tokenizes a comment of the textual data to develop a representation in an n-dimensional space. Additionally, comment program 200 uses an unsupervised learning algorithm for obtaining vector representations for words (e.g., words of comments) in the input text. In this example, comment program 200 feeds the input text into the machine learning algorithm that generates a normalized score of the input text (e.g., comment) by comparing the raw score with results from a sample population, which comment program 200 uses to infer a personality profile of a posting account that includes personality, needs, and values characteristics. Comment program 200 reports a percentile for personality, needs, and values characteristics as a double in the range of zero (0) to one (1) based on qualities inferred from the input text. Additionally, a percentile of 0.64980796071382 for the personality characteristic indicates that a posting account score for that characteristic is in the 65th percentile.

FIG. 3A depicts profile object 300, which is an example of a database object comment program 200 creates that includes various fields. Profile object 300 includes fields: trait_id, big_five, category, percentile, and score. "Trait_id" is a string of characters that are a unique ID of a characteristic to which the results pertain (e.g., Big Five personality dimensions). "Big_five" are personality characteristics that represent user engagement. "Category" is a string of characters indicates a category of a characteristic (e.g., personality, needs, values, etc.), where personality is a recursive array of trait objects that describes the Big Five dimensions and facets that are inferred from the input text, needs is an array of trait objects that describes the needs that are inferred from the input text, and values is an array of trait objects that describes the values that are inferred from the input text. "Percentile" is the normalized percentile score for a characteristic. "Score" is the raw score for a characteristic. In an example embodiment, comment program 200 utilizes input text (e.g., a social media comment) of application 124 to generate profile object 300 that corresponds to a user ID of a posting account that submitted the input text.

In step 212, comment program 200 classifies activities of the profile of the posting account. In one embodiment, comment program 200 classifies a profile of a posting account based on a generated set of data corresponding to the profile of a posting account. For example, comment program 200 compares personality, needs, and values characteristics of a generated personality profile of a posting account to a personality profile of an agitator or antagonist to classify the posting account. In this example, comment program 200 compares percentiles of characteristics of the profiles of the posting account and the agitator/antagonist to determine whether the characteristics of the profiles match, where a percentile above the mean of 0.5 on a scale of zero (0) to one (1) for a particular characteristic of both profiles indicates a match.

FIG. 3B depicts tone object 400, which is an example of a database object that comment program 200 creates that includes various fields. Tone object 400 includes fields: tone_id, type, classification, comment, and handle. "Tone_id" is a unique, non-localized identifier of an identified tone of the input text. "Type" is the polarity identified in the input text. "Classification" is a personality identifier of a posting account associated with a source of the input text. "Comment" is a string of characters that are representative of the input text. "Handle" is a social media user ID of a posting account that is associated with a source of the input text.

In an example embodiment, comment program 200 utilizes generated and extracted data to populate tone object 400. In this example, comment program 200 extracts a handle (e.g., user ID) and comment from input text of application 124. Additionally, comment program 200 utilizes a machine learning algorithm to determine a tone of the input text. Furthermore, comment program 200 incrementally assigns a tone_id to the input text received.

In step 214, comment program 200 determines relevant information from the textual data. In various embodiments of the present invention, comment program 200 identifies and analyzes semantic features of textual data (e.g., categories, concepts, keywords, etc.) to determine relevant information (e.g., context, topics, etc.) of comments of a posting account of a social media medium. In one embodiment, comment program 200 utilizes natural language understanding (NLU) to determine relevant information of a textual data entry of application 124. For example, comment program 200 uses a semantic parser to convert a comment of a posting account of a social media medium into a first-order logic structures and identifies an intended semantic of the first-order logic structures. In this example, comment program 200 determines a context and a topic of a comment based on semantic features of the comment. Additionally, comment program 200 stores the determined context and topic of the comment in a database of a server.

FIG. 3C depicts context object 500, which is an example of a database object comment program 200 creates that includes various fields. Object 500 includes fields: context_id, category, and concept. "Context_id" is a string of characters that are a unique ID of identified semantic features of text input. "Category" is a taxonomy of input text that includes a five-level classification hierarchy. "Concept" is a high-level idea of the input text. For example, a research paper about deep learning might return the concept, "Artificial Intelligence" although the term is not mentioned. In an example embodiment, comment program 200 utilizes NLU to extract semantic features (e.g., context, concepts, etc.) from input text (e.g., a social media comment) of application 124 to populate context object 500.

In step 216, comment program 200 validates the textual data. In one embodiment, comment program 200 utilizes NLU and determined relevant information to determine whether a textual data entry of application 124 is valid user feedback. For example, comment program 200 retrieves the context and topic of a comment of a posting account of a social media medium (determined in step 214). Additionally, comment program 200 identifies one or more related comments of the posting account by using NLU techniques to match the context and topic of the comment with the context and topic of the one or more related comments of the posting account. In this example, comment program 200 compares percentiles of characteristics of the one or more related comments and characteristics percentiles of an agitator/antagonist profile to determine whether the characteristics of the one or more related comments match, where a percentile above the mean of 0.5 on a scale of zero (0) to one (1) for a particular characteristic of the one or more related comments and the agitator/antagonist profile indicates a match.

In one scenario, if comment program 200 determines that one or more related comments is a match with an agitator/antagonist profile, then comment program 200 stores the comment and related data (e.g., date, characteristic, context, etc.) in a database object (e.g., agitator/antagonist table) for user feedback. In another scenario, if comment program 200 determines that one or more related comments is not a match with an agitator/antagonist profile, then comment program 200 stores the comment and related data in a database object (e.g., feedback table) for user feedback.

FIG. 3D depicts feedback object 600 and agitator object 700, which is an example of a database object comment program 200 creates that includes various fields. Feedback object 600 and agitator object 700 include fields: tone_id, trait_id, context_id, and date. In an example embodiment, comment program 200 extracts tone_id, trait_id, and context_id of a comment (e.g., input text) of application 124 from profile object 300, tone object 400, and context object 500 respectively, to populate feedback object 600 and agitator object 700. Additionally, comment program 200 extracts an input date from metadata of application 124 to populate a date field of feedback object 600 or agitator object 700.

In step 218, comment program 200 performs a defined action. In one embodiment, comment program 200 detects a set of conditions and utilizes application 124 to perform a defined action. For example, comment program 200 detects a post of a user of a social media medium receives an agitator comment and transmits a message to an administrator of a user-specific profile corresponding to the post. In this example, the message can include a customized database object that comment program 200 creates that includes data associated with the agitator comment. In another example, comment program 200 detects a profile of a user of a social media medium receives an agitator comment, and based on preferences provided by an administrator and/or user of the profile, comment program 200 may delete the agitator comment and/or delete a user ID of the agitator from the social media medium. In yet another example, comment program 200 may block a user ID of the agitator from interacting (e.g., commenting) with a profile of a user.

In decision step 220, comment program 200 determines whether the validated textual data there is a trend. In one embodiment, comment program 200 determines whether relevant information of a validated textual data entry exceeds a user defined number of matches of relevant information of a data set of validated textual data entries of database 134. For example, comment program 200 monitors a database (e.g., database 134) to detect storage of a validated comment (e.g., a validated textual data entry) in a database object of a server (e.g., server 140). In this example, comment program 200 determines whether a context (e.g., relevant information) of the validated comment matches a context of comments of the database object of the server. Additionally, comment program 200 determines whether the number of matches exceeds a defined threshold number of matches to establish a trend in the comments of the database object.

If comment program 200 determines that relevant information of a validated textual data entry does not exceed a user defined number of matches of relevant information of a data set of validated textual data entries of database 134 (decision step 220, "NO" branch), then comment program 200 continues to determine whether a textual data entry of application 124 is valid user feedback (step 216). For example, if comment program 200 determines that the number of context matches does not exceed a defined threshold number of matches to establish a trend in the comments of the database object, then comment program 200 continues to determine whether a comment is a match with an agitator/antagonist profile.

In step 222, comment program 200 provides a profile warning. More specifically, responsive to comment program 200 determining that relevant information of a validated textual data entry exceeds a user defined number of matches of relevant information of a data set of validated textual data entries of database 134 (decision step 220, "YES" branch), then comment program 200 returns a generated database object of database 134. For example, if comment program 200 determines that the number of context matches exceeds a defined threshold number of matches to establish a trend in the comments of the database object, then comment program 200 provides a customized database object that comment program 200 creates (in step 218) that includes data associated with the agitator comment.

FIG. 3E depicts warning object 800, which is an example of a database object comment program 200 creates that includes various fields. Warning object 800 includes fields: tone_id, type, comment, handle, context, concept, agitator warning, topic warning, and context warning. In an example embodiment, comment program 200 extracts tone_id, type, comment, handle, context, and concept of a comment (e.g., input text) of application 124 from profile object 300, tone object 400, and context object 500 respectively, to populate warning object 800. In this example, comment program 200 utilizes techniques described above (in step 210 and step 212) to determine an agitator warning for an input text. Additionally, comment program 200 utilizes NLU and data of context object 500 to determine whether a topic and context of the input text is within a domain (i.e., the derived topic and context of the comment is not within a specific domain related to a profile of the administrator). Furthermore, comment program 200 returns warning object 800 to an administrator in response to a query and/or comment program 200 identifying a trend in a data set of validated textual data entries of database 134.

Figure 4:
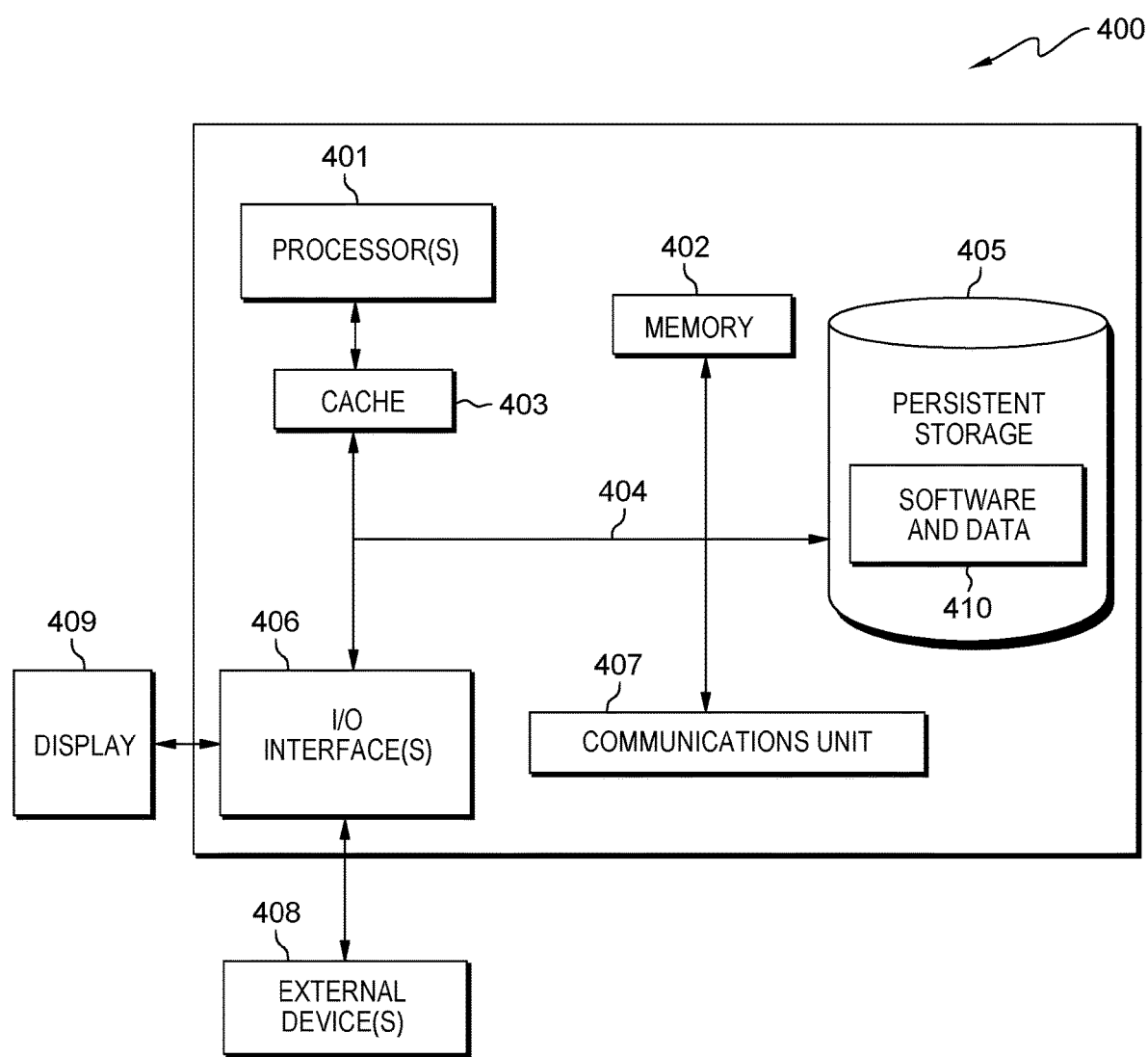
FIG. 4 is a block diagram of components of the client device and server of FIG. 1, in accordance with an embodiment of the present invention.

FIG. 4 depicts a block diagram of components of client device 120 and server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of application 124. With respect to server 130, software and data 410 includes comment program 200 and data of storage device 132.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
identifying, by one or more processors, a textual data entry to an interactive internet-based application;
determining, by one or more processors, a tone of the textual data entry comprises a negative tone;
in response to determining the tone of the textual data entry comprises a negative tone, identifying, by one or more processors, a posting account corresponding to the textual data entry;
generating, by one or more processors, a personality profile corresponding to the identified posting account based on the textual data entry associated with the identified posting account;
determining, by one or more processors, a context of the textual data entry based on semantic features of the textual data entry;
classifying, by one or more processors, the personality profile corresponding to the identified posting account into a first classification;
validating, by one or more processors, the textual data entry based on the first classification and the context, wherein validating comprises determining that the negative tone of the textual data entry is a valid use of feedback and does not include a trend; and
in response to classifying the personality profile corresponding to the identified posting account into the first classification and validating the textual data entry, delaying a defined action that prevents engagement between the identified posting account and the interactive internet-based application.

2. The method of claim 1, further comprising:
identifying a second textual data entry comprising second context to an interactive internet-based application;
determining a tone of the second textual data entry comprises a negative tone;
validating, by one or more processors, the second textual data entry of the identified posting account;
determining, by one or more processors, that the second context of the validated second textual data entry exceeds a defined threshold for a data set that includes two or more validated textual data entries; and
in response to determining that the second context of the validated second textual data entry exceeds the defined threshold for the data set, performing the defined action that prevents engagement between the identified posting account and the interactive internet-based application on the exceeding of the defined threshold.

3. The method of claim 2, further comprising:
generating, by one or more processors, an object of a database based at least in part on the textual data entry, the context of the textual data entry, and the personality profile corresponding to the identified posting account; and
in response to determining that the context of the validated textual data entry exceeds a defined threshold for the data set that includes two or more validated textual data entries, returning, by one or more processors, the object of the database.

4. The method of claim 1, wherein generating the personality profile corresponding to the identified posting account based on the textual data entry associated with the identified posting account, further comprises:
parsing, by one or more processors, the textual data entry to detect words commonly associated with a polarity;
retrieving, by one or more processors, structured and unstructured textual data of the interactive internet-based application associated with the identified posting account, wherein the structured and unstructured textual data includes one or more comments of the identified posting account;
tokenizing, by one or more processors, the one or more comments of the identified posting account;
inputting, by one or more processors, the tokenized one or more comments into a machine learning algorithm; and
generating, by one or more processors, a set of data of the identified posting account based at least in part on a normalized score of the machine learning algorithm for the tokenized one or more comments, wherein the set of data includes the normalized scores of one or more personality characteristics, value characteristics, and need characteristics.

5. The method of claim 1, wherein determining the context of the textual data entry based on semantic features of the textual data entry, further comprises:
parsing, by one or more processors, the textual data entry of the identified posting account; and
identifying, by one or more processors, one or more semantic features of the textual data entry of the identified posting account, wherein the one or more semantic features includes at least a category, concept, and keyword of the textual data entry.

6. The method of claim 1, wherein classifying the personality profile corresponding to the identified posting account, further comprises:
extracting, by one or more processors, one or more characteristics of the personality profile of the identified posting account;
comparing, by one or more processors, the extracted one or more characteristics of the personality profile to one or more characteristics of a set of data, wherein the set of data corresponds to a personality profile of a user labeled as a first classification;
determining, by one or more processors, that the personality profile of the posting account includes above a defined threshold number of characteristics of the personality profile of the user labeled as the first classification, wherein the determination is based on the comparison; and
in response to determining that the personality profile of the posting account includes above the defined threshold number of characteristics of the personality profile of the user labeled as the first classification, wherein the determination is based on the comparison, labeling, by one or more processors, the personality profile of the posting account as corresponding to the first classification.

7. The method of claim 1, wherein the defined action is selected from a group consisting of: transmitting a message, deleting a user ID, blocking a user ID, or removing the textual data entry.

8. A computer program product comprising:
one or more computer readable storage media and program instructions stored on the one or more computer readable storage media, the program instructions comprising:
program instructions to identify a textual data entry to an interactive internet-based application;
program instructions to determine a tone of the textual data entry;

program instructions to determine the tone of the textual data entry comprises a negative tone;
program instructions to, in response to determining the tone of the textual data entry comprises a negative tone, identify a posting account corresponding to the textual data entry;
program instructions to generate a personality profile corresponding to the identified posting account based on the textual data entry associated with the identified posting account;
program instructions to determine, by one or more processors, a context of the textual data entry based on semantic features of the textual data entry;
program instructions to classify the personality profile corresponding to the identified posting account into a first classification;
program instructions to validate the textual data entry based on the first classification and the context, wherein validating comprises determining that the negative tone of the textual data entry is a valid use of feedback and does not include a trend; and
in response to classifying the personality profile corresponding to the identified posting account into the first classification and validating the textual data entry, program instruction to delay a defined action that prevents engagement between the identified posting account and the interactive internet-based application.

9. The computer program product of claim 8, further comprising program instructions, stored on the one or more computer readable storage media, to:
identify a second textual data entry comprising second context to an interactive internet-based application;
determine a tone of the second textual data entry comprises a negative tone;
validate the second textual data entry of the identified posting account;
determine that the second context of the validated second textual data entry exceeds a defined threshold for a data set that includes two or more validated textual data entries; and
in response to determining that the second context of the validated second textual data entry exceeds the defined threshold for the data set, perform the defined action that prevents engagement between the identified posting account and the interactive internet-based application on the exceeding of the defined threshold.

10. The computer program product of claim 9, further comprising program instructions, stored on the one or more computer readable storage media, to:
generate an object of a database based at least in part on the textual data entry, the context of the textual data entry, and the personality profile corresponding to the identified posting account; and
in response to determining that the context of the validated textual data entry exceeds a defined threshold for the data set that includes two or more validated textual data entries, return the object of the database.

11. The computer program product of claim 8, wherein program instructions to generate the personality profile corresponding to the identified posting account based on the textual data entry associated with the identified posting account, further comprise program instructions to:
retrieve structured and unstructured textual data of the interactive internet-based application associated with the identified posting account, wherein the structured and unstructured textual data includes one or more comments of the identified posting account;
tokenize the one or more comments of the identified posting account;
input the tokenized one or more comments into a machine learning algorithm; and
generate a set of data of the identified posting account based at least in part on a normalized score of the machine learning algorithm for the tokenized one or more comments, wherein the set of data includes the normalized scores of one or more personality characteristics, value characteristics, and need characteristics.

12. The computer program product of claim 8, wherein program instructions to determine the context of the textual data entry based on semantic features of the textual data entry, further comprise program instructions to:
parse the textual data entry of the identified posting account; and
identify one or more semantic features of the textual data entry of the identified posting account, wherein the one or more semantic features includes at least a category, concept, and keyword of the textual data entry.

13. The computer program product of claim 8, wherein program instructions to classify the personality profile corresponding to the identified posting account, further comprise program instructions to:
extract one or more characteristics of the personality profile of the identified posting account;
compare the extracted one or more characteristics of the personality profile to one or more characteristics of a set of data, wherein the set of data corresponds to a personality profile of a user labeled as a first classification;
determine that the personality profile of the posting account includes above a defined threshold number of characteristics of the personality profile of the user labeled as the first classification, wherein the determination is based on the comparison; and
in response to determining that the personality profile of the posting account includes above the defined threshold number of characteristics of the personality profile of the user labeled as the first classification, wherein the determination is based on the comparison, label the personality profile of the posting account as corresponding to the first classification.

14. The computer program product of claim 8, wherein program instructions to perform the defined action that prevents engagement between the identified posting account and the interactive internet-based application, further comprise program instructions to:
select the defined action from a group consisting of: transmitting a message, deleting a user ID, blocking a user ID, or removing the textual data entry.

15. A computer system comprising:
one or more computer processors;
one or more computer readable storage media; and
program instructions stored on the computer readable storage media for execution by at least one of the one or more processors, the program instructions comprising:
program instructions to identify a textual data entry to an interactive internet-based application;
program instructions to determine a tone of the textual data entry;
program instructions to determine the tone of the textual data entry comprises a negative tone;

program instructions to, in response to determining the tone of the textual data entry comprises a negative tone, identify a posting account corresponding to the textual data entry;

program instructions to generate a personality profile corresponding to the identified posting account based on the textual data entry associated with the identified posting account;

program instructions to determine, by one or more processors, a context of the textual data entry based on semantic features of the textual data entry;

program instructions to classify the personality profile corresponding to the identified posting account into a first classification; and program instructions to validate the textual data entry based on the first classification and the context, wherein validating comprises determining that the negative tone of the textual data entry is a valid use of feedback and does not include a trend; and in response to classifying the personality profile corresponding to the identified posting account into the first classification and validating the textual data entry, program instruction to delay a defined action that prevents engagement between the identified posting account and the interactive internet-based application.

16. The computer system of claim 15, further comprising program instructions, stored on the one or more computer readable storage media for execution by at least one of the one or more processors, to:

identify a second textual data entry comprising second context to an interactive internet-based application;

determine a tone of the second textual data entry comprises a negative tone;

validate the second textual data entry of the identified posting account;

determine that the second context of the validated second textual data entry exceeds a defined threshold for a data set that includes two or more validated textual data entries; and in response to determining that the second context of the validated second textual data entry exceeds the defined threshold for the data set, perform the defined action that prevents engagement between the identified posting account and the interactive internet-based application on the exceeding of the defined threshold.

17. The computer system of claim 16, further comprising program instructions, stored on the one or more computer readable storage media for execution by at least one of the one or more processors, to:

generate an object of a database based at least in part on the textual data entry, the context of the textual data entry, and the personality profile corresponding to the identified posting account; and in response to determining that the context of the validated textual data entry exceeds a defined threshold for the data set that includes two or more validated textual data entries, return the object of the database.

18. The computer system of claim 15, wherein program instructions to generate the personality profile corresponding to the identified posting account based on the textual data entry associated with the identified posting account, further comprise program instructions to:

retrieve structured and unstructured textual data of the interactive internet-based application associated with the identified posting account, wherein the structured and unstructured textual data includes one or more comments of the identified posting account;

tokenize the one or more comments of the identified posting account;

input the tokenized one or more comments into a machine learning algorithm; and generate a set of data of the identified posting account based at least in part on a normalized score of the machine learning algorithm for the tokenized one or more comments, wherein the set of data includes the normalized scores of one or more personality characteristics, value characteristics, and need characteristics.

19. The computer system of claim 15, wherein program instructions to determine the context of the textual data entry based on semantic features of the textual data entry, further comprise program instructions to:

parse the textual data entry of the identified posting account; and identify one or more semantic features of the textual data entry of the identified posting account, wherein the one or more semantic features includes at least a category, concept, and keyword of the textual data entry.

20. The computer system of claim 15, wherein program instructions to classify the personality profile corresponding to the identified posting account, further comprise program instructions to:

extract one or more characteristics of the personality profile of the identified posting account;

compare the extracted one or more characteristics of the personality profile to one or more characteristics of a set of data, wherein the set of data corresponds to a personality profile of a user labeled as a first classification;

determine that the personality profile of the posting account includes above a defined threshold number of characteristics of the personality profile of the user labeled as the first classification, wherein the determination is based on the comparison; and in response to determining that the personality profile of the posting account includes above the defined threshold number of characteristics of the personality profile of the user labeled as the first classification, wherein the determination is based on the comparison, label the personality profile of the posting account as corresponding to the first classification.

* * * * *